US011654379B2

(12) United States Patent
Alper

(10) Patent No.: US 11,654,379 B2
(45) Date of Patent: May 23, 2023

(54) GRANULAR MEDIA FOR BACKWASHABLE PARTICLE FILTER AND FREE PHASE OIL COALESCER

(71) Applicant: MYCELX TECHNOLOGIES CORPORATION, Duluth, GA (US)

(72) Inventor: Hal Alper, Flowery Branch, GA (US)

(73) Assignee: MYCELX TECHNOLOGIES CORPORATION, Duluth, GA (US)

( * ) Notice: Subject to any disclaimer, the term of this patent is extended or adjusted under 35 U.S.C. 154(b) by 36 days.

(21) Appl. No.: 15/774,846

(22) PCT Filed: Oct. 19, 2017

(86) PCT No.: PCT/US2017/057312
§ 371 (c)(1),
(2) Date: May 9, 2018

(87) PCT Pub. No.: WO2018/075728
PCT Pub. Date: Apr. 26, 2018

(65) Prior Publication Data
US 2019/0232195 A1 Aug. 1, 2019

Related U.S. Application Data

(60) Provisional application No. 62/410,623, filed on Oct. 20, 2016.

(51) Int. Cl.
| | |
|---|---|
| *B01D 15/00* | (2006.01) |
| *B01D 17/04* | (2006.01) |
| *C02F 1/40* | (2023.01) |
| *B03D 1/02* | (2006.01) |
| *B03D 1/14* | (2006.01) |
| *C02F 1/00* | (2023.01) |
| *B01J 20/26* | (2006.01) |
| *B01J 20/28* | (2006.01) |
| *B01J 20/32* | (2006.01) |
| *B01J 20/34* | (2006.01) |
| *C02F 1/28* | (2023.01) |
| *C02F 101/32* | (2006.01) |

(52) U.S. Cl.
CPC ............ *B01D 15/00* (2013.01); *B01D 17/04* (2013.01); *B01D 17/045* (2013.01); *B01J 20/26* (2013.01); *B01J 20/28004* (2013.01); *B01J 20/2808* (2013.01); *B01J 20/28071* (2013.01); *B01J 20/28083* (2013.01); *B01J 20/3231* (2013.01); *B01J 20/3293* (2013.01); *B01J 20/3425* (2013.01); *B01J 20/3475* (2013.01); *B03D 1/02* (2013.01); *B03D 1/14* (2013.01); *C02F 1/001* (2013.01); *C02F 1/004* (2013.01); *C02F 1/288* (2013.01); *C02F 1/40* (2013.01); *C02F 1/281* (2013.01); *C02F 1/285* (2013.01); *C02F 2101/32* (2013.01); *C02F 2303/16* (2013.01)

(58) Field of Classification Search
None
See application file for complete search history.

(56) References Cited

U.S. PATENT DOCUMENTS

| | | | |
|---|---|---|---|
| 2,376,912 A | 5/1945 | Green | |
| 3,992,291 A | 11/1976 | Hirs | |
| 4,626,359 A * | 12/1986 | Bennett | B01D 39/06 210/793 |
| 5,882,531 A * | 3/1999 | Cohen | B01D 24/08 210/793 |
| 10,351,639 B2 * | 7/2019 | Mertens | B01J 20/28061 |
| 2001/0042720 A1 * | 11/2001 | Alper | C02F 1/288 210/690 |
| 2002/0036177 A1 | 3/2002 | Ellard et al. | |
| 2004/0011255 A1 * | 1/2004 | Giangrasso | B01J 20/28078 106/601 |
| 2006/0032807 A1 * | 2/2006 | Sansalone | B01J 20/3028 210/263 |
| 2008/0083666 A1 * | 4/2008 | Brown | C02F 9/00 210/202 |
| 2008/0153694 A1 * | 6/2008 | Nishi | C01B 33/128 502/401 |
| 2012/0316251 A1 * | 12/2012 | Alper | C02F 1/285 516/185 |

FOREIGN PATENT DOCUMENTS

| | | | |
|---|---|---|---|
| JP | S50 45777 A | 4/1975 | |
| WO | 2016/025873 A1 | 2/2016 | |
| WO | WO-2016025873 A1 * | 2/2016 | ............. B01D 39/06 |
| WO | 2016/046498 A1 | 3/2016 | |

OTHER PUBLICATIONS

Norisetty et al., "Application of Alumina to Oil and Grease Removal from Refinery Effluent", Hydrol. Current Res., 2011, 5 total pages. (Year: 2011).*
"Fused Mineral Properties", Washington Mills, 8 total pages, obtained from Web Oct. 28, 2021, <https://www.washingtonmills.com/fused-minerals/fused-mineral-properties>. (Year: 2021).*
"Aluminum oxide ceramics", Concise Encyclopedia of Advanced Ceramic Materials, pp. 16-20, published 1991. (Year: 1991).*
International Search Report and Written Opinion for PCT/US2017/057312 dated Feb. 12, 2018.

* cited by examiner

*Primary Examiner* — Jonathan M Peo
(74) *Attorney, Agent, or Firm* — Eversheds Sutherland (US) LLP

(57) ABSTRACT

This disclosure relates to new filtration systems, granular substrates, granular media and processes that are highly effective for removing suspended oil, particulates and oily particulates from an oil-water mixture. The new filtration media comprises a microporous granular substrate having a combination of specified micro-porosity, hardness and additional characteristics, the substrate being modified by an infused or coated absorption composition. This resulting filtration media displays excellent filtration performance, including outstanding durability and robustness to sustain its excellent performance over a large number of backwash cycles.

31 Claims, No Drawings

GRANULAR MEDIA FOR BACKWASHABLE PARTICLE FILTER AND FREE PHASE OIL COALESCER

CROSS-REFERENCE TO RELATED APPLICATIONS

This application is a 35 U.S.C. § 371 national stage application of PCT Patent Application No. PCT/US2017/057312, filed Oct. 19, 2017 (WO 2018/075728, published 26 Apr. 2018), which claims priority from U.S. provisional patent application Ser. No. 62/410,623, filed on Oct. 20, 2016, both of which are incorporated herein by reference their entireties.

TECHNICAL FIELD

This disclosure relates to methods and systems for filtering or separating oil, particulates and oily particulates from water.

BACKGROUND

Granular media filters are known for use in removing contaminants from fluids and are often used for separating suspended solids or particulates from a fluid. Common granular filtration media include materials such as sand, anthracite, gravel, and the like. The fluid to be treated—most often water—flows through a granular media filter bed such that suspended solids become trapped in the interstices formed between individual granules of media.

The filtration of particulates becomes much more difficult when the particulates are suspended or occur in an oil-water mixture, which requires separation of the oil component from the mixture or emulsion along with the particulates or oily particulates. Conventional filtration of oily particulates and/or suspended oil and particles also uses a granular media, the effectiveness of which depends at least upon the ability of the particular media to withstand a backwash cycle. In a backwash cycle, these loosely held contaminants can be largely removed and the filtration media regenerated.

Backwashable filters used for removal of oil, particulates and oily particulates commonly employ a filtration media made of nutshells, such as black walnut or pecan nutshells. Nutshell filters are particularly used in the oil and gas industry for removing oil and other contaminants from water produced from a subterranean formation. However, the performance of such media is limited by the frangibility of the nutshells. Upon repeated backwashing, conventional nutshell media break apart, which creates fines and smaller particulates and adversely affects the porosity of the media. What are needed are new filtration media that are more resilient and more resistant to backwashing, in order for the performance of the media to be maintained over a great number of backwash cycles. Particularly needed are new filtration media and processes that work well to remove suspended oil when the particulates are suspended or occur in an oil-water mixture.

SUMMARY OF THE DISCLOSURE

This disclosure provides new filtration systems, granular substrates and media, and processes that have been discovered to be highly effective for removing suspended oil, particulates and oily particulates from an oil-water mixture. It has been discovered that a filtration media having a certain combination of features provides improved performance in removing these contaminants and in regeneration of the filtration bed by backwashing. Specifically, the new filtration media comprises a microporous granular substrate that meets certain criteria of high porosity and hardness, which can be combined with at least partially coating onto or infusing into the microporous granular substrate an absorption composition. This combination of porosity, hardness and absorption composition coating or infusion has been discovered to impart excellent performance to the filtration media, including outstanding durability and robustness that sustain its excellent performance over a large number of backwash cycles. Among other things, the disclosed filtration media is capable of removing smaller oil droplets than walnut shell filters and able to function effectively during large spikes in inlet oil concentration, while maintaining the outlet oil concentration specification.

The term microporous granular "substrate" is generally used herein to refer to the substrate material having the specified hardness, porosity and other properties, prior to being coated or infused with the absorption composition. Once the microporous granular substrate is at least partially coated or infused with the absorption composition, the resulting material is generally referred to as a microporous granular "media" or as an "ACM" microporous granular media, reflecting the fact the microporous granular substrate has been "absorption composition modified" to provide the microporous granular media. In some aspects, the microporous granular substrate is used without the absorption composition in the disclosed methods and apparatus, and for clarity, it is referred to as a "substrate" even though it is used in the absence of the absorption composition, to distinguish it from the microporous granular media which includes an absorption composition.

In one aspect, at least a portion of the microporous granular substrate can be at least partially coated or infused with a viscoelastic absorption composition comprising a homogeneous thermal reaction product of an oil component selected from the group consisting of glycerides, fatty acids, fatty acid esters, alkenes and alkynes, and a methacrylate or acrylate polymer component. It is this combination of the specific properties of the microporous granular substrate and the absorption composition that imparts the ability of the ACM microporous granular media to coalesce the oil droplets and the suspended oily particulates, and to retain the particulates, oil, and oily particulates in the filter bed. Thus, the disclosed process effectively prepares the contaminated water for more advanced treatment of dissolved or emulsified chemicals and oil further downstream.

In a further aspect, the filtration system that uses the disclosed microporous granular substrate or ACM microporous granular media can operate as a backwashable particle filter and free phase oil coalescer, because the microporous granular substrate has been tested and shown to be hard enough and possess other structural and surface energy properties to effect the complex filtration process and to withstand the vigorous cleaning to regenerate the filter such as by backwashing. While not bound by any theory of operation, it has been found that the disclosed microporous granular substrate coated or infused with the absorption composition can function as a particle filter, which may allow an amount of the oil to pass through its initial solid particle interception zone and be coalesced by the ACM microporous granular media downstream of the initial solid particle interception zone. Oil coalesced in this way can be periodically purged from the device to good effect because of the unusually high hardness of the specific ACM microporous granular media, resulting from the hardness of the microporous granular substrate. Intercepted particulate matter can be purged from the primary interception zone and from the rest of the media through the use of periodic fluidized backwashing involving water agitation, sparging, and the like.

Previously, there were no filtration media with the recognized ability to show improved performance in a filtration process over that of the nutshell media filters. Even nutshell media suffered from the frangibility of the media, which limited the number of backwash cycles the filter could undergo before becoming clogged and ineffective. When repeatedly backwashed, the frangible nutshell filtration media crumble, which adversely affects the porosity and useful life of the media. The disclosed microporous filtration media are much more resilient during backwashing, and their performance can be maintained over a great number of backwash cycles. Moreover, the new filtration media work extremely well to remove particulates and oily particulates when the particulates are suspended or occur in an oil-water mixture.

According to one aspect, there is provided a method of removing oil and particulate contaminants from contaminated water, the method comprising the steps of:
 a) flowing water contaminated with suspended oil droplets and/or particulates through a filter bed comprising a microporous granular media, the microporous granular media comprising a microporous granular substrate having a MyCelx Hardness ($H_M$) (as hereinafter defined) of at least or about 7.0; and
 b) coalescing at least a portion of the oil droplets during flow and retaining the coalesced oil in the filter bed and/or retaining at least a portion of the particulates in the filter bed;
 wherein at least a portion of the microporous granular media is at least partially coated or infused with an absorption composition comprising a homogeneous thermal reaction product of an oil component selected from the group consisting of glycerides, fatty acids, fatty acid esters, alkenes and alkynes, and a methacrylate or acrylate polymer component.

In a further aspect, this disclosure provides for a method of removing oil and particulate contaminants from contaminated water, the method comprising the steps of:
 a) flowing water contaminated with suspended oil droplets and/or particulates through a filter bed comprising a microporous granular substrate having a MyCelx Hardness ($H_M$) of at least or about 7.0; and
 b) coalescing at least a portion of the oil droplets during flow and retaining the coalesced oil in the filter bed and/or retaining at least a portion of the particulates in the filter bed;
 wherein at least a portion of the microporous granular substrate is optionally at least partially coated or infused with an absorption composition comprising a homogeneous thermal reaction product of an oil component selected from the group consisting of glycerides, fatty acids, fatty acid esters, alkenes and alkynes, and a methacrylate or acrylate polymer component.

In either of the above processes, the processes can further comprise the steps to regenerate the filter bed, such as the steps of:
 c) terminating the flow of contaminated water after the coalesced oil and/or particulates have been retained in the filter bed;
 d) turbulently backwashing the filter bed with retained oil and particulate contaminants with a backwash liquid to release the contaminants, and separating the released contaminants from the backwashed filter bed; and
 e) re-initiating the flow of water contaminated with suspended oil droplets and/or particulates through the filter bed.

In another aspect, this disclosure provides a method of removing oily contaminants from contaminated water, comprising the steps of:
 a) flowing water contaminated with freely suspended oil particles in excess of that sufficient to surface wet any solid contaminants which are present through a filter bed of ACM microporous granular media comprising a microporous granular substrate having a MyCelx Hardness ($H_M$) of at least or about 7.0 within a filter housing;
 b) coalescing the oil particles during the contaminated water flow through the filter bed and independently accumulating coalesced oil contaminants in the interstices of the filter bed during the flow of water therethrough, to achieve a clarified effluent;
 c) terminating the flow of contaminated water after the filter bed has become at least partially saturated with accumulated contaminants;
 d) cleaning the filter bed by (i) injecting diluent liquid into said bed to form a liquid mixture including filter bed granules and contaminants; (ii) agitating the liquid mixture to dislodge the accumulated contaminants from the filter bed granules; and (iii) removing contaminants from the microporous granular media; and
 e) reforming the filter bed of ACM microporous granular media for further filtration flow.

In yet a further aspect, this disclosure provides a method for removing contaminating suspended solid particles and/or oil droplets from a thereby contaminated aqueous stream, the method comprising:
 a) flowing the contaminated stream through a granular filter bed for a predetermined period, to entrap and hold the particles and/or droplets at the bed; then,
 b) following said predetermined period, backwashing the said bed with a clean aqueous stream while fluidizing the bed, to release and separate the said contaminants and thereby enable regeneration of the bed for further filtration;
 c) reforming the regenerated bed; and
 d) reinstituting flow of the contaminated stream through the filter bed;
 wherein the granules of said filter bed comprise an absorption composition modified (ACM) natural or synthetic microporous granular substrate, having a MyCelx Hardness ($H_M$) of at least or about 7.0, whereby the granules are not substantially compacted by steps a) through c), enabling the bed to retain high efficiency for successive cyclic repetition of steps a) through d).

In these embodiments and aspects, the microporous granular media is described as having a MyCelx Hardness ($H_M$) of at least or about 7.0 and a pore size of up to or about 400 Å (40 nanometers), with a practical lower limit of pore size of about 2 Å (0.2 nm) to about 5 Å (0.5 nm). While not intending to be theory bound, it is believed that such hardness values are useful in providing the utility for the microporous granular, such that the granular media is not frangible under standard filter backwash conditions.

These and other aspects, embodiments and features are provided in the disclosure and appended claims.

DETAILED DESCRIPTION

Disclosed herein are new filtration systems, filtration substrates and filtration media fabricated using the filtration substrates, and filtration methods that are effective for removing suspended particulates, oil, and oily particulates from an oil-water mixture, and for preparing the water for advanced treatments of dissolved or emulsified oil further downstream. In an aspect, the filtration substrates and filtration media can be deployed using prior art filtration devices and backwashing methods, or can be used with any other filtration system and backwashing method, such as those disclosed herein.

Properties of a suitable media include hardness, the requisite surface energy, and a porous structure, as well as void space when formed into a filter bed to allow oil to pass through the media beyond the primary particle interception zone and be coalesced by further media past this zone. Being absent these properties, conventional filtration media typically allow the formation of an impermeable mass or plug of heavy oil and particulate matter, which will rapidly clog and shut down the system. Therefore, among other things, the microporous granular substrate and media disclosed herein are sufficiently hard that they do not crumble and are not frangible throughout the cycles of operation of the filtration system, including the violent backwashing process.

Conventional nutshell filtration media used to remove suspended particulates and oil from contaminated water will become choked or clogged with use by significant retention of suspended particles, but also become clogged by microbial fouling by sulfate reducing bacteria contained in the water. These nutshell media can also become coated with the liquid oily contaminants and become clogged. Therefore, the filtration media must be regularly cleaned by backwashing, media scrubbing or the like. Backwashing normally flushes water across the media in a reverse direction to remove filtered particulate matter. If desired, backwashing may be accompanied by additional mechanical agitation to assist in removing all contaminants such as oil adhered to the media. Mechanical agitation can be achieved by fluidizing the media bed by circulating fluid across the media to create a media slurry, and then circulating the slurry through a centrifugal pump and the like to create a shearing action to liberate the adhered contaminant from the media into the liquid phase.

Natural materials other than nutshells have been investigated as potential filtration media for use as described herein, and these have been examined for their strength to withstand backwashing, for their affinity for attracting and accumulating suspended oils, and then for subsequently releasing accumulated oils during filter bed rejuvenation. However, prior to this disclosure, no known natural materials could match the performance of the nutshell filters. It has now been discovered that certain synthetic or natural microporous material can be used as a microporous granular substrate used to prepare a microporous granular media and such media can be used in the disclosed process, based on the specific properties of the substrate and media. Specifically, an ACM microporous granular media has been prepared having a MyCelx Hardness ($H_M$) of at least or about 7.0, at least a portion of which is at least partially coated or infused with an absorption composition comprising a homogeneous thermal reaction product of an oil component selected from the group consisting of glycerides, fatty acids, fatty acid esters, alkenes and alkynes, and a methacrylate or acrylate polymer component.

Throughout this disclosure, the terms "coated" and "infused" and similar terms are used interchangeably to reflect that any method can be used to apply the absorption composition to the microporous granular substrate to generate the ACM microporous granular media, and any such materials are the subject of the disclosure and claims. Therefore, regardless of the process used to apply the absorption composition to the microporous granular substrate and regardless of the extent of the coating or infusion, any absorption composition modified microporous granular media described herein is encompassed by the claims. For example, the absorption composition can be melted and aerosolized for application as a molten mist to the substrate, in which case the substrate may be more precisely described as being coated with a layer of the absorption composition. Alternatively, the absorption composition can be dissolved in a suitable solvent and applied by contacting the substrate under various conditions that can result in, for example, permeation of the absorption composition into some of the pores of the microporous granular substrate, in which case the substrate may be more precisely described as being infused with the absorption composition. These exemplary methods and a number of other methods are possible for producing the absorption composition modified microporous granular media of this disclosure.

The microporous granular substrate and microporous granular media properties allow the present granular media filters to function as a particulate filter that can operate in streams which contain dispersed oil, and which are able to coalesce the oil and cause it to separate from the stream. A feature of the coated or infused microporous granular media filters is their ability to intercept and hold intercepted particles down to about 3 µm (micron) size. These filters form a cake layer of intercepted particulates, including oily particulates, and secondarily also adsorb and entrap the oil in the interstitial voids of the infused microporous granular filtration media, cause the oil to coalesce and rise to the top of the vessel where it can be periodically purged.

Microporous Granular Substrate

In one aspect, the microporous granular substrate that have been discovered to provide the suitable substrate properties for at least partial coating or infusion can be or can be selected from any granular substrate that provides the combination of porosity and hardness. The microporous granular substrate component is described herein according to its hardness, its porosity, and optionally further described according to its surface energy, size, and the like. Once the microporous granular substrate is coated or infused to, and while not intending to be bound by theory, the resulting ACM microporous granular media is thought to remove particulates in the presence of oil by acting to some extent as a filter aid, which allows the formation of a filter cake, while further functioning as an oil coalescer to separate oil from the mixture. Therefore, the microporous granular substrate used to produce the ACM microporous granular media should be hard enough to withstand the vigorous cleaning to regenerate the filter during backwashing. The microporous granular substrate can be used without the absorption composition or with at least a partial coating of the absorption composition to form the ACM microporous granular media.

By describing the granular substrate as microporous, it is intended to reflect an average pore size (average pore diameter) of up to or about 400 Å (40 nanometers (nm)), typically up to or about 300 Å (30 nm) or up to or about 200 Å (20 nm). The lower limit of such a microporous granular substrate can vary, but generally from about 2 Å (0.2 nm) to about 5 Å (0.5 nm) is the lower practical limit of pore size. Accordingly, suitable microporous granular substrate can have an average pore size of about 0.2 nm, about 0.5 nm, about 1 nm, about 1.5 nm, about 2.0 nm, about 2.5 nm, about 3 nm, about 3.5 nm, about 4 nm, about 4.5 nm, about 5 nm, about 5.5 nm, about 6 nm, about 6.5 nm, about 7 nm, about 7.5 nm, about 8 nm, about 8.5 nm, about 9 nm, about 9.5 nm, about 10 nm, about 10.5 nm, about 11 nm, about 11.5 nm, about 12 nm, about 12.5 nm, about 13 nm, about 13.5 nm, about 14 nm, about 14.5 nm, about 15 nm, about 15.5 nm, about 16 nm, about 16.5 nm, about 17 nm, about 18.5 nm, about 19 nm, about 19.5 nm, about 20 nm, about 25 nm, about 30 nm, about 35 nm, or about 40 nm, including any ranges or combination of ranges between any of these values. For example, the suitable microporous granular substrate can have a pore size from about 0.2 nm to about 40 nm; alternatively, from about 0.5 nm to about 30 nm; alternatively, from about 1 nm to about 20 nm; alternatively, from about 5 nm to about 18 nm; alternatively, from about 7 nm to about 15 nm; or alternatively, from about 10 nm to about 12.5 nm. The skilled artisan will appreciate that the pore size of the microporous granular substrate can varied by, among other ways, the selection of a natural media or the method by which a synthetic media is prepared.

Suitable microporous granular substrates are also characterized by pore volumes that work well for use according to this disclosure. Generally, the microporous granular substrates according to this disclosure can have a pore volume from about 0.005 cm$^3$/g to about 0.5 cm$^3$/g. For example, the microporous granular substrates can have a pore volume of about 0.005 cm$^3$/g, about 0.01 cm$^3$/g, about 0.015 cm$^3$/g, about 0.02 cm$^3$/g, about 0.025 cm$^3$/g, about 0.03 cm$^3$/g, about 0.035 cm$^3$/g, about 0.04 cm$^3$/g, about 0.045 cm$^3$/g, about 0.05 cm$^3$/g, about 0.055 cm$^3$/g, about 0.06 cm$^3$/g, about 0.065 cm$^3$/g, about 0.07 cm$^3$/g, about 0.075 cm$^3$/g, about 0.08 cm$^3$/g, about 0.085 cm$^3$/g, about 0.09 cm$^3$/g, about 0.1 cm$^3$/g, about 0.15 cm$^3$/g, about 0.2 cm$^3$/g, about 0.25 cm$^3$/g, 0.3 cm$^3$/g, about 0.35 cm$^3$/g, 0.4 cm$^3$/g, about 0.45 cm$^3$/g, or about 0.5 cm$^3$/g, including any ranges or combination of ranges between any of these values. For example, the suitable microporous granular substrate can have a pore volume from about 0.005 cm$^3$/g to about 0.5 cm$^3$/g; alternatively, from about 0.01 cm$^3$/g to about 0.1 cm$^3$/g; alternatively, from about 0.02 cm$^3$/g to about 0.07 cm$^3$/g; alternatively, from about 0.03 cm$^3$/g to about 0.055 cm$^3$/g; or alternatively, from about 0.035 cm$^3$/g to about 0.045 cm$^3$/g. The person of skill in the art will appreciate that the pore volume of the microporous granular substrate can varied by, among other ways, the selection of a natural media or the method by which a synthetic media is prepared.

The hardness of suitable microporous granular substrates can vary, and the most useful microporous granular substrates are those having high hardness value as measured empirically by the methods described herein. This empirical hardness used for the substrates is referred to as the MyCelx Hardness ($H_M$), a unitless number, references the Mohs hardness values in its determination. MyCelx Hardness ($H_M$) can be determined as set out in Example 1. Generally, MyCelx Hardness reflects the toughness of a media in fluidized bed applications generally, such as in backwashing stages of a filtration system. The $H_M$ hardness scale also accounts for fractional values between the integer values of a Mohs hardness scale. Generally, the most useful microporous granular substrates are those having a high MyCelx Hardness value, generally at least or about $H_M$ of 7.0 (that is, about $H_M \geq 7.0$).

The MyCelx Hardness ($H_M$) determination protocol is carried out generally by initially determining a particle size distribution ("PSD") of a combined granular "test" substrate to be examined and a granular "reference" substrate material having a known or assigned a nominal hardness value. For example, a sample of silica quartz sand which has a Mohs hardness of 7 can be used as a reference substrate to determine the threshold hardness of suitable substrates used according to this disclosure. The initial PSD determination can be carried out by any means, for example, the PSD of the test substrate and reference substrate combination can be determined by passing it through a set of standard test sieves in series from largest to smallest mesh size, and weighing the amount of the mixture that is captured on each sieve.

Next, the combination of test and reference substrates is energetically contacted, for example in a conventional tumbler apparatus that is operated under specified conditions. For example, the MyCelx Hardness ($H_M$) protocol typically uses a standard ball roller apparatus that is charged with the weighed and characterized sample of the test substrate material and the reference substrate material having a known or assigned nominal Mohs hardness. The reference substrate for this measurement is used in lower concentration in the mixture than the test substrate. For example, the reference substrate can be present at 10 wt % or less of the weight of the measured (weighed) combined sample of the test substrate and the reference material. After engaging the roller for generally about 1 hour operated at about 45 revolutions per minute (rpm), which is a sufficient period time to dissipate approximately 250 kiloJoules (kJ) of energy per kilogram (kg) in the combined test sample and reference sample, the resulting material is again characterized by PSD in the same manner used to characterize the PSD of the sample before tumbling. For example, after tumbling, the PSD of the combination of test substrate material and reference material can be determined by again passing it or sifting it through the set of standard test sieves in series from largest to smallest mesh size, and weighing the amount of the mixture that is captured on each sieve. If there has been substantially no change in the PSD as determined from the sieve analysis, then the substrate material is considered to have an minimum $H_M$ hardness as that of the standard material of known or assigned hardness.

Use of the phrase, "substantially no test substrate material passes through the sieve", it is intended to mean that there has been no significant change in the PSD of the sample of granular test substrate and granular reference material following the MyCelx Hardness testing protocol described herein (see Examples). Thus, following the tumbling protocol for any substrate to be tested, the coefficient of determination, $R^2$ is used as a measure of the change in PSD as described herein in the Examples. If the coefficient of determination $R^2 \geq 0.99$, then there has been no significant change in the particle size distribution of the mixture according to the requirements of this disclosure, and the test substrate is suitable for use in the filtration methods and devices described herein. In alternative embodiments, no significant change in the PSD of the combined granular test substrate and granular reference material is observed if $R^2 \geq 0.98$, if $R^2 \geq 0.97$, or if $R^2 \geq 0.96$, and the test substrate is suitable for use according to this disclosure.

It has been discovered that these coefficient of determination ($R^2$) values are particularly good indicators in the MyCelx Hardness test when the reference substrate for this measurement is used in concentrations in the mixture with the test substrate of less than or about 10 wt % (in the combined sample), when the roller is engaged for about 1 hour at about 45 revolutions per minute (rpm). While about 10 wt % is generally employed, the reference substrate can be used in concentrations in the mixture of about 9 wt %, about 8 wt %, about 7 wt %, about 6 wt %, about 5 wt %, about 4 wt % or about 3 wt %, or even somewhat lower.

However, for standard measurement purposes that include the 1 hour at 45 rpm tumbling conditions, about 10 wt % is employed.

In this silica quartz example, if there has been no significant change or alteration of the test substrate following the MyCelx Hardness testing protocol described herein, then the substrate material has a minimum MyCelx Hardness of $H_M \geq 7.0$. Such a substrate is suitable for the methods and systems described herein. While not bound by theory, it has been found that such a test protocol is capable of accounting for many parameters that are related to hardness, but that are difficult or impossible to quantify in order to identify and/or modify a test substrate for the particularly severe conditions of use in a backwashable filter.

If it is desired to determine the MyCelx Hardness ($H_M$) value of the substrate material (other than $H_M \geq 7$), then this process can be repeated with reference samples other than quartz, which have been verified to have a specific Mohs hardness. One advantage of empirically determining MyCelx Hardness ($H_M$) is the ability to finely-tune hardness values and simultaneously account for resistance to abrasion within a given Mohs hardness value, that is, between the integer values of a Mohs hardness. It has been discovered that the MyCelx Hardness ($H_M$) is very useful for determining the practical utility of any particular microporous granular substrate according to this disclosure. For example, reference materials having, for example, a Mohs hardness of 7.5 that could be used to measure a MyCelx Hardness of ≥7.5 if 10 wt % of the reference material is tumbled in the ball roller operated under the conditions specified in Example 1. Thus, after engaging the roller for about 1 hour operated at about 45 revolutions per minute (rpm), a sufficient period time to dissipate approximately 250 kiloJoules (kJ) of energy per kilogram (kg) to the combined sample, if there has been substantially no change in the particle size distribution based on the material passed through the set of sieve, the substrate material has a minimum $H_M$ hardness as that of the standard material of known hardness, in this case, $H_M \geq 7.5$.

By describing the microporous granular substrate or media as being non-frangible under the standard filter backwash conditions or treatment regimen, it is intended to reflect that the microporous granular substrate (used to prepare the ACM microporous granular media) will usually have a MyCelx Hardness ($H_M$) of at least or about 7.0. Alternatively, the microporous granular substrate can have a MyCelx Hardness ($H_M$) of at least or about 7.1, at least or about 7.2, at least or about 7.3, at least or about 7.4, at least or about 7.5, at least or about 7.6, at least or about 7.7, at least or about 7.8, at least or about 7.9, at least or about 8, at least or about 8.1, at least or about 8.2, at least or about 8.3, at least or about 8.4, or at least or about 8.5. Any range of MyCelx Hardness ($H_M$) between any of these specified values are also suitable. Any combination of microporous granular media in which the majority of the microporous granular substrate used in the media has a $H_M$ hardness or range of $H_M$ hardness values according to this disclosure are also suitable. For example, a microporous granular media component that includes a portion of a microporous granular substrate having a $H_M$ hardness of about 7, and a portion having a $H_M$ hardness of about 7.5 and higher is also suitable for infusing the absorption composition and preparing the ACM microporous granular media.

While not intending to be bound by theory, it is believed that the MyCelx Hardness ($H_M$) value is a composite complex number reflecting the combined contributions of surface morphology, tribology, and Mohs hardness to the frangibility of the granular media. Studies with various media suggest that the results conform generally to a rough distribution expected from a step function as compared to a continuous function. This MyCelx Hardness ($H_M$) feature assists in developing filtration media, systems and methods in which the granular media remain intact rather than disintegrate, which maintains consistent and long-lived filtration performance.

Sand is one of the primary constituents of produced water that is filtered using fluidized bed granular media in the upstream portion of produced water treatment. In an aspect, sand can be taken as the test standard at any given location and can be assigned a nominal Mohs hardness of 7. The effect on the test substrate will also be influenced by the surface morphology of the sand, for example, whether the silica sand reference media is more round or more jagged in overall shape, and by the relative size of the sand reference material to the test substrate. The second variable (relative size) is obviated by keeping the test substrate and the reference material relative sizes comparable, with a narrow size range distribution. Typically, either the test substrate or the reference material size is within about 25% of the diameter of each other. Among other things, by maintaining the size difference between the reference material and test substrate, potential triboelectric effects and scaling considerations are avoided.

Accordingly, the silica reference sample and the test substrate are considered to have comparable particle sizes if the average particle size of the reference sample is within the range of ¼× to 4× of the average particle size of the test sample. That is if the average particle size of the reference sample is from one-fourth to four times the average particle size of the test sample, then the samples can be used together in conducting this test. This size range is the same size range obtained when the average particle size of the test sample is within the range of ¼× to 4× of the average particle size of the reference sample. This ratio of the average particle size of the reference substrate to the average particle size of the test substrate in the range of 1:4 to 4:1 is used for determining standard MyCelx Hardness $H_M$, that is, this range is a standard condition for $H_M$ determination. Alternatively, comparable particle sizes are attained if the average particle size of the reference sample is within the range of ⅓× to 3× of the average particle size of the test sample, or alternatively, within the range of ½× to 2× of the average particle size of the test sample. If desirable or if necessary, for example if comparable size samples are not available, the ratio of the average particle size of the reference substrate to the average particle size of the test substrate can be in the range of from 1:10 to 10:1, from 1:9 to 9:1, from 1:8 to 8:1, from 1:7 to 7:1, from 1:6 to 6:1, or from 1:5 to 5:1, for determining MyCelx Hardness $H_M$, that is under non-standard conditions.

Under this regime, reference material may exhibit differences in MyCelx Hardness ($H_M$) values for each distinct geographic location and its native geological formations. Therefore according to another aspect of this invention, MyCelx Hardness ($H_M$) values can be determined according to Example 1, using a reference material sample that contains predominantly sand, that is obtained from the local geological formations that are being drilled. By assigning to the local sand a Mohs reference hardness of 7.0, when flowing water contaminated with suspended oil droplets and/or particulates through a filter bed comprising the tested microporous granular media and/or microporous granular substrate that has been determined by this method to have a MyCelx Hardness ($H_M$) of at least or about 7.0, the granular filtration media remain intact rather than disintegrate, which sustains the consistent and long-lived filtration performance.

Most commercial microporous granular substrates are too soft to be used in the present applications, and they lack the structural integrity to withstand the vigorous conditions of use and regeneration without degrading and crumbling. Particular microporous granular substrate materials that are useful in the disclosed methods and apparatus include, but are not limited to, a microporous quartz, gibbsite, spinel, metal or metal oxide, metal sulfide, montmorillonite, halloysite, natural or synthetic zeolite, natural or synthetic ceramic, silica, marcasite, tourmaline, beryl, and mullite. Thus, the microporous granular substrate can comprise, consist essentially of, consist of, or be selected from any or any combination of these exemplary granular substrates.

Another property found to be useful in identifying suitable microporous granular substrates for preparing the ACM microporous granular media is related to the durability, stability and robustness of the substrate. This robustness or durability can be empirically determined for test substrates as generally set out in Example 2, but in the absence of a reference material, and is referred to as the MyCelx Durability ($D_M$) class. MyCelx Durability accounts for the longevity of the media in backwashing applications. MyCelx Durability $D_M$ is determined by initially characterizing a test substrate according to particle size distribution as was determined in the MyCelx Hardness test using the combined test substrate and reference material. Once the test substrate without a reference material has characterized, a measured weight of the test substrate to be examined is added into a standard ball roller apparatus. The ball roller apparatus is engaged for a sufficient period time to dissipate approximately 6 MJ (6 MegaJoules or 6,000,000 J) of energy per kilogram (kg) in the combined test and reference samples (for example, tumbling for about 24 hours at about 45 rpm). After this time, the resulting material is passed through the same series of sieves used in the initial characterization, the openings of which are as identified previously (see Example 2 herein), and the amounts of test material retained on each sieve is weighed and recorded. Thus, the same test protocol used for the combination of test substrate and reference material is employed and the same before and after sieve test and statistical analysis is carried out. Once the value of $R^2$ is determined as set out in Example 1, then the following relationship may be applied to determine the MyCelx Durability $D_M$ value of the microporous substrate test material:

$D_M$=Class A, if $R^2 \geq 0.99$ according to Example 1;

$D_M$=Class B, if $R^2 \geq 0.95$ according to Example 1; and $D_M$=Class C, if $R^2 \geq 0.90$ according to Example 1.

The particle size distribution is said to have undergone no statistically significant change, or the particle size distribution is said to be not statistically different, if the value $R^2 \geq 0.99$. Alternatively, the particle size distribution is not statistically different, if the value $R^2 \geq 0.95$. Alternatively still, the particle size distribution is not statistically different, if the value $R^2 \geq 0.90$.

MyCelx Durability ($D_M$) Class A works best for the methods and apparatus described herein. While MyCelx Durability ($D_M$) Class B substrates are acceptable in applications for which backwashing cycles are not particularly rigorous, Class C substrates also work well for a shorter time period than the Class A and Class B materials, but are generally not preferred due to their shortly useful lifetime.

One advantage of empirically determining MyCelx Durability ($D_M$) is the ability to finely-tune the substrate selection to simultaneously account for resistance to abrasion of materials already determined to have a suitable hardness, which assists in predicting the useful lifetime of the substrate when used according to this disclosure.

As an example, a test substrate material that is found to have a MyCelx Hardness $H_M$ of at least 7 ($H_M \geq 7$) and a MyCelx Durability ($D_M$) of Class A is also designated as a Class 7A material for convenience, referring to both $H_M$ and $D_M$ values. Again, the MyCelx Durability ($D_M$) test provides additional information related to the longevity of a particular substrate under the backwashing conditions as described in this disclosure.

Test substrate materials found to have a MyCelx Hardness $H_M$ of at least 7 ($H_M \geq 7$) and a MyCelx Durability ($D_M$) of Class A are also designated as a Class 7A materials for convenience, which refers to both $H_M$ and $D_M$ values. Generally, these materials represent the level of minimum hardness and durability for substrates that are useful for preparing the ACM microporous granular media. For example, other suitable substrate materials include but are not limited to those having a classification as 7.3A, 7.3B, 7.5A, 7.5B, 7.7A, 7.7B, 8.0A and 8.0B, again reflecting the combination of MyCelx Hardness ($H_M$) and MyCelx Durability ($D_M$) designations.

Further useful properties of suitable microporous granular substrate can be disclosed, for example, properties which have been discovered to generally work well in the applications described herein. For example, the microporous granular substrate can generally have a particle size (average diameter) ranging from about 0.1 mm to about 6 mm (millimeters). In another aspect, the microporous granular substrate can have an average particle size (average diameter) of from about 0.5 mm to about 5 mm; or alternatively, from about 1 mm to about 4 mm. Generally, the microporous granular substrate can also have an average particle size of about 0.1 mm, about 0.2 mm, about 0.5 mm, about 1 mm, about 1.2 mm, about 1.5 mm, about 2 mm, about 2.5 mm, about 3 mm, about 3.5 mm, about 4 mm, about 4.5 mm, about 5 mm, about 5.5 mm, or about 6 mm. The microporous granular substrate also may have an average particle size (average diameter) ranging between any of these values. Generally, these sizes enable filtration of solid particles at least as small as 3 microns. In one aspect, the ACM microporous granular media itself can also be characterized by the above-disclosed particle sizes.

While not essential, the hard microporous granular substrates such as those described herein typically have a total water content below about 8 wt %, below about 7.5 wt %, below about 7.0 wt %, below about 6.5 wt %, below about 6.0 wt %, below about 5.5 wt %, below about 5.0 wt %, below about 4.5 wt %, below about 4.0 wt %, below about 3.5 wt %, or below about 3.0 wt %. In one aspect, for example, the lower limit of the water content of the microporous granular substrate can be about 0.1 wt %, about 0.5 wt %, about 1 wt %, about 1.2 wt %, about 1.5 wt %, or about 2 wt %. For example, the microporous granular substrate can have a total water content from about 0.5 wt % to about 5 wt %.

When formed into a media bed comprising the microporous granular media or the microporous granular substrate, the media bed can have a typical void fraction of from about 15% to about 45%, that is, the void volume of the media bed itself between the particles of microporous granular media or microporous granular substrate. That is, the media bed void fraction typically can be about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, or about 45%, including any ranges or combination of ranges between any of these values.

When prepared and used according to this disclosure, the ACM microporous granular media that has been infused with the absorption composition is capable of filtering particulates down to about 10 microns, or alternatively down to about 15 microns, down to about 20 microns, down to about 25 microns, down to about 30 microns, down to about 50 microns, down to about 75 microns, down to about 100 microns, down to about 125 microns, or down to about 150 microns particle size.

Any of the aforementioned properties can be combined to describe various suitable microporous granular substrates that can be used to prepare the ACM microporous granular media for use according to this disclosure.

A further aspect of the disclosure provides a method of testing the hardness of a granular substrate (the test substrate) as a procedure that is used in conjunction with the disclosed method of removing oil and particulate contaminants from contaminated water. This disclosure provides a method for testing a granular test substrate to establish an empirically determined hardness, comprising in sequence the steps of:

a) combining a preselected weight w of a granular test substrate with a weight x of a granular reference substrate having a hardness y on an existing standard hardness scale to form a combined substrate sample, the combined substrate sample having an average particle size z, wherein the average particle size of the granular reference substrate is within the range of one-fourth times (¼×) to four times (4×) of the average particle size of the granular test substrate;

b) establishing an initial particle size distribution of the combined substrate sample using a series of sieves, at least one of which has a maximum opening which precludes passage of the combined substrate sample of step a);

c) tumbling the combined substrate sample of step a) in a rotary tumbler for a predetermined period to dissipate energy g in the combined substrate sample; and d) establishing a final particle size distribution of the combined substrate sample using the series of sieves from step b); and e) if there is no statistically significant difference between the final particle size distribution and the initial particle size distribution, assigning an empirically determined hardness (MyCelx Hardness $H_M$) of the test substrate as at least as high as the hardness y of the granular reference substrate ($H_M \geq y$), under testing conditions w, x, y, z, and g, provided further that the ratio of x to w is less than that which could cause said statistically significant difference where $H_M$ is greater than y and; and f) optionally, charging a backwashable filter with the granular test substrate for removing oil and particulate contaminants from contaminated water.

As described in detail, the MyCelx Hardness $H_M$ values were determined using a rotary rock tumbler and the calculated amount of energy dissipated in the tests when the tumbler was operated at 45 revolutions per minute (rpm), based on the similar losses relative to energy delivered for similar devices.

In this method of testing the hardness of a substrate as described above, it has been discovered that in order for the weight ratio of the reference substrate to test substrate to be less than that which could cause a statistically significant difference in PSD where $H_M$ is greater than the hardness of the reference substrate, the reference substrate is used in concentrations in the mixture with the test substrate of less than or about 10 wt % (in the combined sample), when the roller is engaged for about 1 hour at about 45 revolutions per minute (rpm). Using this percentage of reference substrate provides that the coefficient of determination ($R^2$) will be a good indicator for suitability in the filtration devices and methods described herein. While about 10 wt % is generally employed, the reference substrate can be used in concentrations of less than 10 wt %.

Similarly, the average particle size y of the granular reference media generally can be from 25% to 400% of the average particle size of the granular test substrate. Alternatively, the average particle size y of the granular reference media can be from 33% to 300% or from 50% to 200% of the average particle size of the granular test substrate. Alternatively still, the average particle size of one of either the granular test substrate or the granular reference media can within about 10%, 20%, 30%, 40%, 50%, 60%, 70%, 80%, 90%, or 100% of the average particle size of the other granular media. Further, the energy g in tumbling dissipating energy g in the combined media sample can be from 200 kJ/kg of test sample to 300 kJ/kg of test sample. For the purposes of this disclosure, the combined media sample was tumbled in a ball roller apparatus operated at about 45 rpm for about 1 hour, which is taken as a sufficient time to dissipate in the sample mixture about 250,000 J (about 250 kJ) of energy per kilogram (kg) of the combined media sample.

Absorption Composition

In accordance with the disclosure, at least a portion of the microporous granular substrate is coated or infused, or at least partially coated or infused, with an absorption composition comprising a homogeneous thermal reaction product of an oil component selected from the group consisting of glycerides, fatty acids, fatty acid esters, alkenes and alkynes, and a methacrylate or acrylate polymer component. This combination of the properties of the microporous granular substrate itself and the absorption composition is thought to impart the ability of the microporous granular substrate to coalesce the oil droplets and the suspended oily particulates, and to retain the particulates, oil, and oily particulates in the filter bed.

The preparation of the absorption composition and methods for coating and infusing the absorption composition are disclosed in detail in the present applicant's U.S. Pat. Nos. 6,805,727; 6,475,393; 6,180,010; 5,437,793; 5,698,139; 5,837,146; and 5,961,823, all of the disclosures of which is incorporated herein by reference. According to one aspect, the absorption composition prepared in this manner can be viscoelastic, amphiphatic, and/or have a hydrophilic-lipophilic balance (HLB) of less than 13.

The chemistry for the present absorption composition is provided by the thermal reaction product of a drying oil or oils which are caused to crosslink in the presence of oxygen or in a reducing atmosphere. Polymers such as methacrylates are also present. The resultant reaction product is viscoelastic upon combining with oil or oily particulates, in addition to being amphiphatic with a strong oleophilic component (HLB less than 13). Such reaction products are in accord with the disclosures in the previously referenced patents of the present inventor, and may also be referred to herein as MYCELX®, the registered trademark of MyCelx Technologies Corporation, the assignee of said patents, and the commercial source for the compositions.

The present compositions are readily synthesized from a polymer component and an oil component selected from the group consisting of glycerides, fatty acids, fatty acid esters, alkenes and alkynes. In a preferred aspect, the product is synthesized from an isobutyl methacrylate polymer, and the oil component is one derived from a natural oil, such as linseed oil, tung oil, or sunflower oil. Optionally, the composition is then diluted with a solvent, such as 2,2,4-trimethyl-1,3-pentanediol monoisobutyrate or acetone, and the diluted composition can then be applied to at least a portion of the microporous granular substrate for use as a filtration media as disclosed herein.

The polymer component of the present composition can be a synthetic polymer such as polymers derived from methacrylates. In one aspect, the polymer is derived from methyl methacrylate, ethyl methacrylate, isobutyl methacrylate, or n-butyl methacrylate, or may be a copolymer containing a methacrylate polymer. For example, in some embodiments, the polymer is a poly(isobutyl methacrylate) polymer available under the trade name ELVACITE™ 2045, or a methacrylate/methacrylic acid copolymer such as ELVACITE™ 2008 or 2043. However, other similar polymers can be used to prepare similar compositions that can be used according to this disclosure. Combinations of polymers can be used to advantage in the preparation of the present compositions.

In one embodiment of the absorbent composition, the oil component of the composition can be a glyceride derived from natural oils such as oils of vegetable or animal origin. Of the vegetable oils, drying oils such as sunflower, tung, linseed, and the like; and semi-drying oils, such as soybean and cottonseed oil, have been shown to be useful as the glyceride component for use according to this disclosure. Animal oils, such as, for example, fish oil, tallow and lard can also be used as a glyceride component of the composition if desired. It is anticipated that any drying oil or semi-drying oil will work in the composition. Generally, a drying oil is defined as a spreadable liquid that will react with oxygen to form a comparatively dry film. Optionally, combinations of two or more glycerides can be used as reactants with the polymer to provide useful absorbent compositions.

In an aspect, the oil component of the absorbent composition can be a glyceride derived from a drying oil, such as linseed oil, that can be obtained from Cargill, Inc. as Supreme Linseed Oil, or sunflower oil. Where the oil component of the composition is a fatty acid, fatty acid esters, or alkene or alkyne utilized as the reactant with the polymer, it contains from about 8 to 24 carbon atoms, and preferably from about 10 to 22 carbon atoms. Typical fatty acids include both saturated and unsaturated fatty acids, such as lauric acid [dodecanoic acid], linolenic acid, cis-5-dodecanoic acid, oleic acid, erucic acid [cis-docosanoic acid], 10-undecynoic acid, stearic acid, caprylic acid, caproic acid, capric acid [decanoic acid], palmitic acid, docosanoic acid, myristoleic acid [cis-9-tetradecenoic acid], and linoleic acid. Combinations of fatty acids can also be used. Typical alkenes and alkynes contain at least one and preferably one or two degrees of unsaturation, and from about 8 to 24 carbon atoms, with 10-20 carbon atoms being preferred. Generally preferred alkenes and alkynes are those such as 1-decene, trans-5-decene, trans-7-tetradecene, 1,13-tetradecadiene, 1-tetradecene, 1-decyne, and 5,7-dodecadiyne.

The absorbent composition is a product with characteristics different from either of the starting materials or a simple mixture of the two starting materials, thus showing that a new composition is produced by the thermal reaction. Specifically, the oil/polymer absorbent compositions pass a clear pill test after being heated at the elevated temperatures and do not separate into two parts upon being cooled but, rather form a homogenous, uniphase compound.

The absorption composition is described as comprising a homogeneous thermal reaction product of an oil component selected from the group consisting of glycerides, fatty acids or their esters, alkenes and alkynes, and a methacrylate or acrylate polymer component. In some aspects, the thermal reaction product employs fatty acids and fatty acid esters as the first reactant by the direct use of a drying oil such as linseed oil or tung oil. According to another aspect, a completely different first reactant is used, in which an initial glyceride composition is provided which can comprise one or more drying oils and/or semi-drying oils, but this composition is itself not used as the first reactant to produce an absorption composition. Rather the initial glyceride composition is subjected to a cleaving and separating step to yield a blend comprising the constituent saturated and mono- and poly-unsaturated fatty acids, the fatty acid blend being unique to the initial glyceride composition. It is this unique fatty acid blend which is then thermally reacted with a methacrylate or acrylate polymer compound to yield a homogeneous thermal reaction product that constituted the absorption composition.

The preparation of the absorption composition by subjected an initial glyceride composition to a cleaving and separating step to yield a blend comprising the constituent saturated and mono- and poly-unsaturated fatty acids, is set out in detail in the present applicant's U.S. Pat. No. 9,102,549, the disclosure of which is incorporated herein by reference in its entirety. According to one aspect, the absorption composition prepared using the constituent saturated and mono- and poly-unsaturated fatty acids can be viscoelastic, amphiphatic, and/or have a hydrophilic-lipophilic balance (HLB) of less than 13.

According to an aspect of this disclosure, the initial glyceride composition that is subjected to a cleaving and separating step to yield a constituent fatty acid blend can be selected from, or can comprise, one or more drying and/or semi-drying oils from any source and having any level of processing, purification, and/or additives, including having no processing, purification and/or additives. For example, and not by way of limitation, the initial glyceride composition that is subjected to a cleaving and separating step to yield a constituent fatty acid blend can be selected from, or alternatively can comprise:

1) An "off-the-shelf" (OTS) oil, also termed a "commercial" or "purified" oil. The OTS oils typically are natural drying and/or semi-drying oils that have been processed for example by conventional washing, purification, and/or refining steps, and purified to some level to provide a commercial sample. OTS oils also generally include some type of additives such as stabilizers, antioxidants, antiskinning agents (such as methylethyl ketone oxime), rheology modifiers, and/or similar additives.

2) An "unprocessed" oil. An unprocessed oil may be referred to in the art as a "raw" oil, and typically has not been subjected to the conventional washing, purification, and/or refining steps of an OTS oil. However, some level of antioxidants or antiskinning compounds are typically included even in unprocessed oils;

3) A "natural pressed" oil. The term "natural pressed" oil is used herein to reflect a natural oil that has been directly derived from the seed by pressing, but is otherwise unprocessed before its use and absent any additives. Specifically, the natural pressed oil is used without any further purification or washing steps and without the use of any additives such as stabilizers, antioxidants, antiskinning agents (such as methylethyl ketone oxime), rheology modifiers, and the like; and/or 4) any combination thereof.

The initial glyceride composition can be selected from, or can comprise, a drying oil, a semi-drying oil, or a combination thereof. Examples of useful oils include but are not limited to linseed oil, safflower oil, tung oil, soybean oil, menhaden oil, hemp oil, sunflower oil, rapeseed oil, and the like, including mixtures thereof.

In one aspect, natural pressed oils can be useful, for example, in providing a more tailored end product. For example, natural pressed oils can offer more controllable curing or crosslinking by allowing any additives such as curing agents or rheology modifiers to be selected and added if and when desired. The natural pressed oils also can be customized according to the particular source selection for the specific oil, such as the region, climate, or season.

Coating or Infusing the Microporous Granular Substrate with the Absorption Composition Methods by which the microporous granular substrate can be infused are disclosed in, for example, the present applicant's U.S. Pat. No. 6,180,010, the disclosure of which is incorporated herein by reference. This patent discloses infusing an absorption composition into a filtration media that can comprise, for example, paper, porous ceramics, mineral particulates, or alternatively comprise non-woven materials such as polypropylene.

When the microporous granular substrate of this disclosure is infused with the absorption composition, the weight percentage of absorption composition in or on the infused or coated microporous granular substrate generally can be from about 0.05 wt % to about 1 wt % as it is used in a filtration device. For example, the infused or coated ACM microporous granular media can comprise about 0.05 wt % of absorption composition in the final weight of the microporous granular media used for filtration. Alternatively, the infused or coated microporous granular media can comprise about 0.1 wt %, about 0.15 wt %, about 0.2 wt %, about 0.25 wt %, about 0.3 wt %, about 0.35 wt %, about 0.4 wt %, about 0.45 wt %, about 0.5 wt %, about 0.55 wt %, about 0.6 wt %, about 0.65 wt %, about 0.7 wt %, about 0.75 wt %, about 0.8 wt %, about 0.85 wt %, about 0.9 wt %, about 0.95 wt %, or about 1 wt % of absorption composition in the final weight of the microporous granular media used for filtration.

According to an aspect, filter methods and apparatus can be used according to this disclosure, in which a portion or all of the microporous granular media is infused or coated with the absorption composition. In other aspects, about 0.01 wt % (weight percent), about 0.02 wt %, about 0.05 wt %, about 0.1 wt %, about 0.2 wt %, about 0.5 wt %, about 1 wt %, about 2 wt %, about 5 wt %, about 10 wt %, about 20 wt %, about 30 wt %, about 40 wt %, about 50 wt %, about 60 wt %, about 70 wt %, about 80 wt %, about 90 wt %, or about 100 wt % of the microporous granular substrate used in a filter can be infused or coated with the absorption composition, including any ranges between these values. In some embodiments, about 0.01 wt % to about 5 wt %, about 0.02 wt % to about 2 wt %, or about 0.1 wt % to about 1 wt %, of the microporous granular substrate used in a filter can be infused or coated with the absorption composition. In other aspects, the majority (greater than about 50 wt %) or substantially all of the microporous granular media used can be infused or coated with the absorption composition. For the purposes of this aspect, reference to "substantially all" means at least or about 80 wt %, at least or about 85 wt %, at least or about 90 wt %, at least or about 95 wt %, at least or about 97 wt %, or about 100 wt %.

Filtration System Use and Backwashing

According to an aspect, the microporous granular substrate or microporous granular media of this disclosure can be used in the same general manner as nut shell media when used in various filtration systems. For example, the microporous granular media or granular substrate can be used in down flow, deep bed filters, in which liquid passes through the microporous granular media or substrate bed, and oil, solids and oily solids are efficiently retained in the bed. These contaminants can be readily backwashed out of the microporous granular media or substrate bed by known methods as understood by the skilled person in the art. Backwashing can be accomplished by fluidizing the media or substrate bed to remove the oil and solids, and no separate chemicals or surfactants are required for the backwash. In some cases, air sparging steps can be eliminated, or alternatively, additional steps such as air sparging or use of surfactants and the like can be employed if desired.

The microporous granular media or substrate of this disclosure can be used in filter systems to remove, for example, suspended solids and hydrocarbons from produced water, surface water, sea water, river water, lake water, and well water, in metal working operations, power generation plants, various municipal facilities, and chemical and petrochemical and oil exploration applications. In these applications, the filter systems comprising the microporous granular media or granular substrate treat and remove suspended solids, oily residues, ash, and metallic hydroxides and oxides, for example, from industrial liquids.

Because the granular media or substrate bed undergoes scrubbing cycles, filter bed fouling is avoided. Moreover, the absorption composition used in coating or infusing the microporous substrate to form the microporous granular media has been found to be useful in controlling microbial proliferation at a material in contact with a fluid that contains microbes, such as the microporous granular substrate and media. In addition, the absorption composition has been found to further remove microbes and endotoxins from the fluid, and therefore provides a method for controlling microbial proliferation in a filter system and media when in contact with a microbe-containing fluid. These features are described in the Applicant's U.S. Patent Appl. Publication Nos. 2012/0315240 and 2015/0305330, each of which is incorporated by reference in its entirety. In the backwash mode, feed water can be used for the backwashing and backwash volume is low (for example, it can be 0.5% to 1% of throughput) so that waste volume is minimized. The hardness of the microporous granular media and/or substrate is such that the media and/or substrate is not broken or ground up during use, thereby providing extended service life to the microporous granular media or substrate.

Therefore, in one aspect, this disclosure provides a method of removing oil, particulates, and oily particulate contaminants from contaminated water, the method comprising:

a) flowing water contaminated with suspended oil droplets and/or particulates through a filter bed comprising a microporous granular media, the microporous granular media comprising a microporous granular substrate having a MyCelx Hardness ($H_M$) of ≥7.0; and b) coalescing at least a portion of the oil droplets during flow and retaining the coalesced oil in the filter bed and retaining at least a portion of the particulates in the filter bed;

wherein at least a portion of the microporous granular media is at least partially coated or infused with an absorption composition comprising a homogeneous thermal reaction product of an oil component selected from the group consisting of glycerides, fatty acids, fatty acid esters, alkenes and alkynes, and a methacrylate or acrylate polymer component.

It is envisioned that all or only some of the microporous granular media can be coated or infused with an absorption composition, at least to some extent, for use in the disclosed processes and systems.

In a further aspect, this disclosure provides a method of removing oil, particulates, and oily particulate contaminants from contaminated water, the method comprising:

a) flowing water contaminated with suspended oil droplets and/or particulates through a filter bed comprising a microporous granular substrate, the microporous granular substrate having a MyCelx Hardness ($H_M$) of ≥7.0; and b) coalescing at least a portion of the oil droplets during flow and retaining the coalesced oil in the filter bed and retaining at least a portion of the particulates in the filter bed.

Accordingly, the general process described above can further include the steps of: c) terminating the flow of contaminated water after the coalesced oil and/or particulates have been retained in the filter bed; d) turbulently backwashing the filter bed with retained oil and particulate contaminants with a backwash liquid to release the contaminants, and separating the released contaminants from the backwashed filter bed; and e) re-initiating the flow of water contaminated with suspended oil droplets and/or particulates through the filter bed.

In some embodiments, a microporous granular substrate that meets the hardness criteria as set out herein can be used in combination with the ACM microporous granular media that has been coated or infused with an absorption composition. In these embodiments, the microporous granular substrate can be used in a mixture with the ACM microporous granular media, or the microporous granular substrate can be used as an initial layer or initial filter bed that is contacted with the oil and particulate contaminated water prior to contact with the ACM microporous granular media. In other embodiments, the microporous granular substrate can be used in a separate filter or filter bed from the ACM microporous granular media or with other absorption composition modified granular media. It is also envisioned that different microporous granular substrates having different densities can be used, such that the higher density microporous granular substrate is used to prepare the ACM microporous granular media, and the lower density microporous granular substrate is not coated or infused with an absorption composition. In this embodiment, it is envisioned that a mixture of these two materials can be used such that, following a backwashing step, the higher density ACM microporous granular media settles to the bottom of the filter bed, and the lower density microporous granular substrate primarily settles last on the top of the filter bed. Such as system may allow an amount of the oil to pass through its initial solid particle interception zone (lower density microporous granular substrate) and be coalesced by the higher density ACM microporous granular media downstream of the initial solid particle interception zone.

In one aspect, this disclosure provides a method of removing oily contaminants from contaminated water, the steps of:

a) flowing water contaminated with freely suspended oil particles in excess of that sufficient to surface wet any solid contaminants which are present through a filter bed of ACM microporous granular media in which the microporous granular substrate used to prepare the ACM microporous granular media has a MyCelx Hardness ($H_M$) of within a filter housing;

b) coalescing oil particles during the contaminated water flow through the filter bed and independently accumulating coalesced oil contaminants in the interstices of the filter bed during the flow of water therethrough, to achieve a clarified effluent;

c) terminating the flow of contaminated water after the filter bed has become at least partially saturated with accumulated contaminants;

d) cleaning the filter bed of by (1) injecting diluent liquid into said bed to form a liquid mixture including filter bed granules and contaminants; (2) violently agitating the liquid mixture to dislodge the accumulated contaminants from the filter bed granules; and (3) removing contaminants from the filter bed granules; and e) reforming the filter bed of granules for further filtration flow.

The cleaning step can be further characterized by flowing the liquid mixture through a flow path which is in part exterior to the filter housing, and withdrawing part of the diluent liquid and contaminants from the liquid mixture flow through a perforated surface in said flow path. The step of cleaning can be further characterized by flowing the agitated liquid mixture over a perforated element, and withdrawing at least a portion of the diluent liquid and contaminants through said perforated element.

The filtration media used for suspended particulate removal and as an oil coalescer is completely oil and water resistant and does not deteriorate over extended periods of use and has a high hardness ($H_M$) for resistance to breakage and structural deterioration. The unique properties of the filter granules allow for use to intercept suspended particles and oils and accumulate and hold these contaminants until they are released during a backwash cycle.

The manner of removing the accumulated particulate and oily contaminants from the bed will depend in part upon the characteristics of the particular oily contaminants being filtered and the filtration techniques used. For example, if the filter bed is rejuvenated only infrequently after the filter bed has become totally saturated, the filter bed may require violent agitation to break up the agglomerated mass of filter granules, filtered particulates, and accumulated oil. This could include slurrying the filter media and accumulated contaminants, and flowing the slurry exterior to the filter housing through a flow line to free the accumulated contaminants from the filter granules. In this example, the slurry could then be returned through the flow line back to the filter housing, where the bed could be reformed and then backwashed in a conventional manner. If this particular regeneration technique is used, the physical characteristics of the filter granules described earlier such as hardness are particularly useful to maintain the filter particle structural integrity. If the filter bed is regenerated frequently, less violent agitation may suffice and reverse backwashing may be all that is required.

Such regeneration techniques may also be a function of granular size. Ideally, the contaminants can be removed through a simple backwash cycle including introduction of fluid flow through the media bed in a reverse direction to normal filtration flow. However, it may be desirable to turbulently agitate the media bed during the backwash cycle, for example, by introducing scouring gas such as air by sparging the air or gas into the bed. As a further modification, it may be found desirable to form a slurry of the granular media bed of and flow the slurry over a perforated element, as disclosed for example in U.S. Pat. No. 3,550, 774. These disclosed backwashing techniques are simply exemplary and will provide the desired media regeneration to free at least a portion of the intercepted particulates and captured oily contaminants from the bed. The following sections illustrate specific prior art and non-prior art examples of filtration system operation and backwashing.

The filtration media or substrate disclosed herein can be used in accordance with any conventional or non-conventional filtration devices and methods, including in any of the various generations of backwashable filter systems, if desired. For example, the ACM microporous granular media or substrate can be used as a drop-in replacement for nutshell media, or in combination with nutshell media, in a backwashable filter system. A brief discussion of using the ACM microporous granular media in a standard or conventional backwashable granular media filtration apparatus follows, although the disclosed media is not limited to use in these standard filtration systems. Thus, the microporous granular media of this disclosure also can be used in any backwashable filtration device such as, for example, the filtration device disclosed in U.S. Pat. No. 8,828,237.

A backwashable filtration apparatus or system can operate in either a filtration mode or in a backwash mode. The filtration apparatus includes a filtration vessel that holds the microporous granular media, which is typically supported on screen of some type. The filtration vessel generally includes inflow and outflow valves and conduits at the top of the vessel and inflow and outflow valves and conduits at the bottom of the vessel, allowing the vessel to operate alternatively in either filtration mode or backwash mode.

In filtration mode, the fluid flow is from the top to the bottom of the filtration vessel. If desired, a diffuser can be used within the vessel to distribute the incoming water flow across a larger cross section of the granular media bed. As contaminated water enters the vessel, it permeates through the filter bed, oily particulates and suspended solids become trapped in the interstices between the media particles, and oil becomes loosely adsorbed or adhered to the surfaces of the media where it coalesces. After passing through the filter bed, the clean water outflow exits through a lower valve at the bottom of the filtration vessel. Over time, prolonged use of filtration apparatus in filtration mode will load the microporous granular media of the filter bed with particulates and oil adhering to the particulates held at the media. The microporous granular media can then be regenerated by backwashing to remove the particulates and oil. As described below, backwashing generally occurs by terminating the flow of contaminated water and turbulently backwashing the filter bed with its retained oil and/or particulate contaminants with a backwash liquid, generally clean water, to release the contaminants.

In backwash mode the fluid flow is from the bottom to the top of the filtration vessel, therefore the valve controlling contaminated water inflow at the top is closed, but a valve at the top that allows outflow of contaminated water derived from backwashing is opened. Similarly, in backwash mode, the valve that controls clean water outflow at the bottom is closed, but a valve at the bottom that allows the inflow of a backwash liquid such as clean water is opened. Clean backwash water enters the bottom of the vessel, creates a fluidized bed and turbulently backwashes the filter media that contains the retained oil and/or particulate contaminants. These contaminants are released and separated from the granular filtration media, and the oil removed from the microporous granular media goes into the water phase of the slurry. The treated slurry is discharged through the top of the filtration vessel. The freeboard volume in the filtration vessel above the fluidized bed allows the released contaminants to exit through the backwash outflow through an upper valve, while the microporous granular media is retained in the filtration vessel.

At the end of the backwash cycle, the released and separated contaminants are removed from the backwashed filter bed, and the flow of water contaminated with suspended oil, mineral particulates, and oily particulates can be re-initiated through the filter bed. Thus, returning the filtration apparatus to the filtration mode by re-initiated flow through the filter bed can be carried out.

In another aspect or embodiment of this disclosure, a filtration system has been designed that utilizes only a reverse-flow backwashing step for regenerating the filtration media. This filtration system is similar to other filters using conventional media such as anthracite, sand, carbon, gravel, and the like. This design focuses on forward flow of about 8-10 gpm/ft$^2$ surface area, and utilizes a backwash rate of about 10-15 gpm/ft$^2$ depending on the incoming TSS (total suspended solids) and O&G (oil and grease) loading. The time the backwashing process is carried out (backwash time) can vary, generally as a function of influent loading. This filtration system can use about a 36 inch to 48 inch media bed depth. Good operational efficiency is achieved using at least about a 50% backwash freeboard, with about 60% or alternatively about 75% backwash freeboard working very well, if available. As in conventional media filters, this system can use hub/lateral and header/lateral type bottom distributor systems. By using only a reverse-flow backwashing step for regenerating the filtration media, this system avoids the requirement for an eductor as used in the filtration device disclosed in U.S. Pat. No. 8,828,237.

In various embodiments, filtration systems according to this disclsoure can use various backwashing processes that increase sheering, which can help minimize or reduce waste water volume. Examples of methods to increase shearing include but are not limited to: 1) in-vessel media agitation using air/gas introduction to media bed; 2) partial media bed agitation through external mechanical means such as pump and/or an air/gas system; and 3) in-vessel media agitation using a mechanical mixer. For example, a sparging or air/gas scour method or other mechanical agitations can be used to enhance the release of suspended particulates and oil and thereby reduce backwash volume. If volatile organic compounds (VOC) are a potential issue, the sparging or air scour method may be combined with additional gas filtration systems, such as disclosed in U.S. Pat. No. 6,805,727, which is hereby incorporated by reference herein in its entirety.

Some filter tank designs that can be used according to this disclosure include a tank vent on top, and further include a purge line for the oil that is collected at the top of the vessel from the oil influent or coalesced off the top of the media. This purge line is positioned in the center of the vessel at the highest apex of the top dome, which assists with the purge at a low flow/velocity in order to remove the oil from inside the tank during normal operation. That is, if the purge flow is too high, there is a danger that the flow will purge some of the water and not the oil. Normal operation of the filtration system usually includes a backwashing step that can be conducted at about 15 psid (pounds per square inch differential), although higher or lower differential pressures work in various systems.

Finishing or Polishing

Once the suspended particulates and oil are removed from the contaminated water, the relatively clean water may still contain chemically and/or mechanically emulsified oil and higher molecular weight organic compounds which may not be completely separated by the coalescer and method of this disclosure. Therefore, in some embodiments the filtration method can include a finishing or polishing step downstream of the present apparatus comprising the ACM microporous granular media. Such downstream finishing or polishing filters can use a MyCelx composition filter, such as disclosed in the present inventor's U.S. Pat. Nos. 6,475,393, 6,180,010, 5,437,793, 5,698,139, 5,837,146, and 5,961,823, each of which is incorporated by reference herein.

These MyCelx composition filters incorporate the same type of absorption composition as described herein that is used to infuse or coat the microporous granular media. In this downstream use, the absorption composition may be infused into a fluid-pervious filter element, such as for example, and non-woven polypropylene filter. Such MyCelx composition filters have extremely strong affinities for the contaminants in oily water, such that concentration levels of the contaminants may be reduced to very low values in a single pass of the oily water.

In these downstream polishing filters, the MyCelx composition is generally infused into or on a porous filtration media. As described above, the composition can comprise a homogeneous thermal reaction product of an oil component selected from the group consisting of glycerides (one or more drying oils and/or semi-drying oils), fatty acids, fatty acid esters, alkenes, and alkynes; and a methacrylate or acrylate polymer component. On passing oily water streams containing these contaminants through the MyCelx containing filtration media, these contaminants are immobilized at the media, and their concentration levels in the filtrate may be reduced to very low values in a single pass. The glyceride component generally can comprise or can be selected from one or more drying oils and/or semi-drying oils. These polishing stage absorption compositions are not limited to the specific absorption compositions disclosed in the U.S. patents disclosed and incorporated by reference, but also may include for example, additional compositions falling within the aforementioned description of the compositions, such as improvements upon the previously patented compositions which yet remain within the technical description stated immediately above in this paragraph.

Also as described above, in the polishing filtration stage, the oil component reactant can be selected from fatty acids or fatty acid esters that are derived from the one or more drying oils and/or semi-drying oils. Thus, the drying oils and/or semi-drying oils can be subjected to a cleaving and separating step to yield a blend comprised of purified saturated and mono and poly-unsaturated fatty acids, the fatty acid blend being unique to the initial glyceride composition. It is this unique fatty acid blend which is then thermally reacted with a methacrylate or acrylate polymer compound to yield a homogeneous thermal reaction product having coagulation and viscoelastic rheology modification properties. The thermal reaction product prepared in this manner has been found to itself be a uniquely distinct composition, which possesses considerably enhanced characteristics and effectiveness when employed as disclosed herein.

Filter configurations incorporating the polishing stage absorption compositions may be based on various water permeable substrates, such as shredded, spun or otherwise configured polypropylene or shredded or spun cellulose, which substrates are infused or otherwise treated with the absorbent compositions, which are then cured. These substrates may then be packed or otherwise disposed in a cartridge or canister filter, or the substrates can be formed into cured and infused bag filters which can be emplaced in canisters through which the contaminated water is flowed. Similarly, the said absorbent compositions can be incorporated into or upon other filtering substrates and media if desired, including for example, paper, compressed pulp materials, particulate porous foamed plastics, mineral particulates such as perlite and vermiculite, and particulate, fibrous or porous ceramic or porous (for example, sintered) metal substrates and media.

The fluid pervious filtration medium that is infused with the polishing stage composition can be any fluid pervious filtration medium that is compatible with the composition that is infused into and on the medium, and further compatible with the use of the filtration system in the polishing stage of the disclosed method and use. For example, the fluid pervious medium can be selected from a nonwoven polypropylene, paper, a porous ceramic, a metal, a mineral particulate, vermiculite, and perlite, and materials having similar properties.

EXAMPLES

Any use of the past tense to describe an example otherwise indicated or understood as constructive or prophetic is not intended to reflect that the constructive or prophetic example has actually been carried out. Applicant further reserve the right to proviso out any selection, feature, range, element, or aspect, for example, to limit the scope of any claim to account for a prior disclosure of which Applicant may be unaware, or if the Applicant elects to claim less than the full scope of the disclosed subject matter.

Example 1

Measuring the MyCelx Hardness ($H_M$) of a Test Substrate for Establishing its Suitability in Removing Oil and Particulate Contaminants The empirical MyCelx Hardness ($H_M$) determination is used in identifying and selecting suitable microporous granular substrates that can be used in the backwashable filtration methods and devices, either uncoated or at least partially coated with the absorption compositions as described herein (to form the ACM microporous granular media). The general procedure of determining the empirical MyCelx Hardness ($H_M$) values is presented in this Example.

General Details. The MyCelx hardness test references the Mohs hardness scale assigned to various minerals. The Mohs hardness scale is an ordinal scale which ranks a test material relative to 10 pure standard minerals that are assigned Mohs hardness values from 1 to 10. Mohs hardness is based upon a scratch test using these standard mineral samples to determine which of the standard minerals are capable of scratching a sample of the test material.

In the MyCelx hardness test, the relevant materials to be tested generally have particle sizes that are too small for a traditional Mohs scratch test using bulk mineral samples, and it is also likely that a traditional Mohs scratch test would not provide sufficiently relevant information about the robustness of the test substrate. Therefore, the dynamic MyCelx Hardness $H_M$ test is used to determine the hardness and robustness of the test substrate employing a rock tumbler. Generally, a mixture of a known weight ratio of test substrate and reference material is challenged in the tumbler for a certain time period, and before and after samples are examined for changes in the particle sizes and particle size distribution. Any significant change (as defined herein) in the size or size distribution (as defined below) results in the assignment of the test substrate the nominal MyCelx Hardness $(H_M)$ value of $H_M$ less than the hardness of the reference material sample. If there is no significant change in median size or size distribution of the test substrate, the test substrate is assigned the nominal MyCelx Hardness $(H_M)$ value of $H_M$ of at least the hardness of the reference material sample. One feature of this test method is the use of a particular weight ratio of test substrate to reference substrate, wherein the weight ratio of the granular reference substrate to the granular test substrate is less than that which could cause a statistically significant difference where the $H_M$ value is greater than the hardness of the granular test substrate. Typically, the reference substrate can be present at about 10 wt % or less of the weight of the measured (weighed) combined sample of the test substrate and the reference material.

Generally, the reference substrate for testing is a silica quartz standard which is used to determine if the potential substrate material is robust enough for use as disclosed, because silica sand typically is the most abundant mineral that will be encountered in the field applications of this apparatus and method. The MyCelx Hardness $(H_M)$ determination uses a standard ball roller apparatus with a measured (weighed) sample of the substrate material, along with a sample of silica quartz which is known to have (Option A) or is assigned to have (Option B) a Mohs hardness of 7, as explained below. This MyCelx Hardness test is used to determine whether the candidate microporous granular substrate (the "test" media) has a MyCelx Hardness $H_M$ is greater than or about 7, designated $H_M{\geq}7$, and hence is suitable for the use described herein.

This test is not limited to determining a threshold MyCelx Hardness $H_M$ value of greater than or about 7, because other MyCelx hardness values can be determined using this test. For example, a sample of topaz or cubic zirconia which is known to have a Mohs hardness of 8 can be used, and any candidate substrate that passes this test is assigned $H_M{\geq}8$.

If desired, further subsequent testing can then be used to fine tune the substrate identification and selection process by determining the MyCelx Durability $D_M$ value of the sample, as set out in Example 2.

Reference Substrate Material Option A. A relatively homogeneous reference substrate sample of silica quartz can be obtained from various commercial sources, taking into account the average particle size requirements noted below. For example, Aldrich Chemical Company offers commercial samples of silicon dioxide (silica) that can be selected according to the particle size requirements as explained in the Procedure section below. Depending upon the visual inspection of the sample, if desired, the reference substrate can be washed with water until the rinse water is clear and allowed to dry and equilibrate to ambient conditions before use.

Reference Substrate Material Option B. A sample of sand is taken as the hardness reference standard at any given location, either surface or subsurface sand, and is assigned a nominal MyCelx Hardness of 7. In practical terms, most surface or subsurface sand references samples are predominantly silica sand. However, this option of selecting the reference sample allows fine-tuning the MyCelx Hardness test with the local conditions and better account for the presence of amounts of minerals that may be, for example, harder than silica sand. Unless otherwise specified, the MyCelx Hardness $(H_M)$ of at least or about 7.0 can be measured using either one of these reference sample options, and a measured value of $H_M{\geq}7.0$ refers to a measurement made using either reference sample option.

In this option, the sample of surface or subsurface sand is obtained and washed with water until the rinse water is clear and allowed to dry and equilibrate to ambient conditions before use. Washing generally removes water soluble materials and provides a more homogeneous sample. Under this regime, reference material (or reference "substrate") may exhibit differences in MyCelx Hardness $(H_M)$ values for each distinct geographic location and its native geological formations. However, by assigning such reference media at $H_M$ of 7, the selected test substrate to be used in the backwashable filtration device is closely matched in its hardness properties to the specific local requirements, such that test substrate with a MyCelx Hardness $H_M$ is at least 7 $(H_M{\geq}7)$ are suitable for use in filtering the local produced water.

Procedure for measuring the MyCelx Hardness $(H_M)$ of a test substrate. Once the reference sample (reference "substrate") described above is obtained, the following general steps are used to determine the MyCelx Hardness $(H_M)$ of the substrate to be tested (the "test substrate), based on a reference silica quartz material having a Mohs hardness of 7, even though these can be carried with variations that do not affect the basic parameter being tested.

A. Initial Characterization of the Size Distribution of the Combined Substrates by Weight 1) Using an electronic balance capable of measuring to 0.1 milligram and a set of USA standard test sieves of mesh sizes nos. 18, 20, 25, 30, and 35, the initial, empty weight of each sieve is recorded. Standard test sieves correspond to the following mesh sizes according to Table 1:

TABLE 1

| Sieve mesh sizes | | |
|---|---|---|
| No. | (mm) | (in) |
| 18 | 1.00 | 0.0394 |
| 20 | 0.85 | 0.0331 |
| 25 | 0.71 | 0.0278 |
| 30 | 0.60 | 0.2362 |
| 35 | 0.50 | 0.0197 |

2) Combine together 9.00 grams (+/−0.09 grams) of test substrate and 1.00 grams (+/−0.01 grams) of a suitable reference material (also termed "reference substrate"), in this case standard quartz sand, and record the total weight. The standard quartz sand reference substrate has a nominal hardness of 7 on the Mohs scale, a diameter size distribution that is 0.5 to 1.0 mm, and an average particle size which is within the range of one-fourth times (¼×) to four times (4×) of the average particle size of the granular test substrate;

3) Characterize the particle size distribution of the mixture of test substrate and reference substrate, in this case standard quartz sand, by passing it through the standard test sieves in series from largest to smallest mesh size.
4) Weigh each sieve and determine the weight of combined material (both test and reference substrates) captured by subtracting the empty weight recorded above in step 1.
5) Calculate and record the weight fraction passing through each sieve according to Table 2:

TABLE 2

Characterization of control (pre-tumbled substrate)

| No. | Name | Formula |
|---|---|---|
| 18 | Control$_{18}$ | 1 − (Weight captured by no. 18)/(Total weight) |
| 20 | Control$_{20}$ | 1 − Σ (Weight captured by nos. 18 and 20)/(Total weight) |
| 25 | Control$_{25}$ | 1 − Σ (Weight captured by nos. 18, 20, and 25)/(Total weight) |
| 30 | Control$_{30}$ | 1 − Σ (Weight captured by nos. 18, 20, 25, and 30)/(Total weight) |
| 35 | Control$_{35}$ | 1 − Σ (Weight captured by nos. 18, 20, 25, 30, and 35)/(Total weight) |

B. MyCelx Hardness ($H_M$) of the Test Substrate with Standard Quartz Sand
  6) Charge the rotating cylinder of a Chicago Electric Power Tools 3 Pound Rotary Rock Tumbler with 315 grams (±3.15 grams) of test substrate and 35 grams (±0.35 grams) of reference substrate, in this case standard quartz sand (total 350 grams).
  7) Turn on tumbler and allow mixture to tumble for 1 hour at 45 rotations per minute.
C. Final Characterization of the Size Distribution of the Combined Substrates by Weight
  8) Using the same set of standard test sieves as before, cleaned from previous use, record the empty weight of each.
  9) Characterize the particle size distribution of the mixture (10 grams) of tumbled test substrate and reference substrate material, in this case standard quartz sand, by passing it through the standard test sieves in series from largest to smallest.
  10) Weigh each sieve and determine the weight of test and reference substrates captured by subtracting the empty weight recorded above in step 8.
  11) Calculate and record the weight fraction passing through each sieve according to Table 3:

TABLE 3

Characterization of sample (post-tumbled substrate)

| No. | Name | Formula |
|---|---|---|
| 18 | Sample$_{18}$ | 1 − (Weight captured by no. 18)/(Total weight) |
| 20 | Sample$_{20}$ | 1 − Σ (Weight captured by nos. 18 and 20)/(Total weight) |
| 25 | Sample$_{25}$ | 1 − Σ (Weight captured by nos. 18, 20, and 25)/(Total weight) |
| 30 | Sample$_{30}$ | 1 − Σ (Weight captured by nos. 18, 20, 25, and 30)/(Total weight) |
| 35 | Sample$_{35}$ | 1 − Σ (Weight captured by nos. 18, 20, 25, 30, and 35)/(Total weight) |

12) Compare the Post-Tumbled Substrate to the Pre-Tumbled Substrate by Calculating the Coefficient of Determination, $R^2$, according to Formulas 1-4.

$$\overline{\text{Control}} = \left(\sum_{x=18}^{35} \text{Control}_x\right) / 5 \quad \text{(formula 1)}$$

$$SS_{tot} = \sum_{x=18}^{35} (\text{Sample}_x - \overline{\text{Control}})^2 \quad \text{(formula 2)}$$

$$SS_{res} = \sum_{x=18}^{35} (\text{Sample}_x - \text{Control}_x)^2 \quad \text{(formula 3)}$$

$$R^2 = 1 - \frac{SS_{res}}{SS_{tot}} \quad \text{(formula 4)}$$

13) If $R^2 \geq 0.99$, then it can be concluded that the test substrate has not been significantly altered by tumbling, that is, the particle size distribution of the combined test and reference substrates has not significantly changed.

Standard MyCelx Hardness Test Conditions. While some variations in the conditions for determining MyCelx Hardness $H_M$ are described herein, unless otherwise specified, $H_M$ values are standard MyCelx Hardness values and are determined using standard MyCelx Hardness conditions, which include: [1] using an average particle size of the granular reference substrate that is within the range of one-fourth times (¼×) to four times (4×) of the average particle size of the granular test substrate; [2] using reference substrate in 10 wt % of the combined test substrate and the reference substrate sample; [3] using a total of 350 grams of the combined test substrate and reference substrate materials for tumbling; [4] tumbling the mixture for 1 hour at 45 rpm (rotations per minute); [5] using a reference substrate material according to Option A, that is, a commercial sample of reference substrate; and [6] using a calculated coefficient of determination $R^2 \geq 0.99$ for determining whether the PSD of the combined test and reference substrates has not significantly changed and therefore, the test substrate is suitable for use in the method and apparatus disclosed herein. Values of MyCelx Hardness $H_M$ can be based on the procedure described in this example, with adjustments to these parameters where specified, when such non-standard conditions are desirable or needed.

A substrate material identified in this manner having $H_M$ of ≥ about 7 is suitable for the applications disclosed herein. Again, if there has been no significant change in the test substrate material, then the test substrate material has a minimum $H_M$ hardness equivalent to the standard media, in this case a $H_M$ of ≥7, and is suitable for use.

If it is desired to determine the $H_M$ value of the media (other than $H_M \geq 7$), then this process can be repeated with reference samples other than quartz, which have been verified or assigned to have a specific Mohs hardness. Once material from the initial test is determined to be suitable, then a subsequent 24 hour MyCelx Durability ($D_M$) test can be run according to Example 2, if desired.

The specific details regarding the sieve sizes and so forth are for illustration purposes, because when testing a substrate that has a different average size and size distribution, a different set of standard sieves are used as appreciated by the skilled person. That is, establishing an initial particle size distribution of the combined test and reference substrate sample is carried out using a series of sieves, at least one of which has a maximum opening which precludes passage of the combined substrate sample.

It has been found that this method works with good reproducibility. While not intending to be bound by theory, it is thought that when the hardness of the reference substrate is greater than the hardness of the test substrate [H(ref)>H (test)], the reference substrate breaks apart the test substrate, and the wt % of the test substrate is sufficiently high that a change in the particle size distribution can be observed under the conditions of the test (1 hour tumbling at 45 rpm). Similarly, and again while not intending to be theory bound, it is thought that when H(ref)=H(test), neither substrate breaks apart to any measureable extent under the conditions of the test and therefore, there is no observed change in the particle size distribution under the test conditions. In this case of using silica sand, the test substrate has $H_M$ of ≥7. Finally, it is thought that when the hardness of the reference substrate is less than the hardness of the test substrate [H(ref)<H (test)], the test substrate may break apart the reference substrate to some extent, but the wt % of the reference substrate is sufficiently low that there is no observed change in the particle size distribution under the conditions of the test (1 hour tumbling at 45 rpm). Again, in this case of using silica sand, the test substrate has $H_M$ of ≥7.

It is noted that other hardness scales can be used in determining suitable substrate materials, such as Vickers, Brinell, or Rockwell, by converting the Mohs hardness of 7 to the desired alternative scale, selecting a reference material of that hardness, and performing the same Example 1 tests using the selected reference sample.

Example 2

Measuring the MyCelx Durability ($D_M$) of a Test Substrate for Establishing its Suitability in Removing Oil and Particulate Contaminants The MyCelx Durability ($D_M$) of a test substrate provides additional information related to the longevity of a particular substrate under the backwashing conditions described in this disclosure. MyCelx Durability is determined without the use of a reference material, and therefore MyCelx Durability ($D_M$) can be determined on a material for which the MyCelx Hardness ($H_M$) is known or not known.

To determine the MyCelx Durability ($D_M$) of any test material, the test substrate material is subjected to the MyCelx Hardness test protocol described in detail in Example 1, except that no reference material is combined with the test material in the tumbling test, and the tumbling is carried out for 24 hours at 45 revolutions per minute (rpm). That is, the entire 350 grams of material that is tumbled is the test substrate material. The same test protocol from Example 1 is employed and the same before and after sieve test using 10 grams of the test substrate and a statistical analysis is carried out. Once the value of $R^2$ is determined according to Example 1, then the following relationship may be applied to determine the MyCelx Durability $D_M$ value of the microporous substrate test material:

$D_M$=Class A, if $R^2$≥0.99 according to Example 1;

$D_M$=Class B, if $R^2$≥0.95 according to Example 1; and $D_M$=Class C, if $R^2$≥0.90 according to Example 1.

For example, a test substrate material that is found to have a MyCelx Hardness $H_M$ of at least 7 ($H_M$≥7) and a MyCelx Durability ($D_M$) of Class A is also designated as a Class 7A material for convenience, referring to both $H_M$ and $D_M$ values. Again, the MyCelx Durability ($D_M$) test provides additional information related to the longevity of a particular substrate under the backwashing conditions as described in this disclosure.

One advantage of empirically determining MyCelx Durability ($D_M$) is the ability to finely-tune the substrate selection to simultaneously account for resistance to abrasion of a materials with a suitable hardness, to assist in predicting the useful lifetime of the substrate when used according to this disclosure. MyCelx Durability ($D_M$) Class A works best for the methods and apparatus described herein. While MyCelx Durability ($D_M$) Class B substrates are acceptable in applications for which backwashing cycles are not particularly rigorous, Class C substrates also work well for a shorter time period than the Class A and Class B materials, but are generally not preferred due to their shortly useful lifetime.

Example 3

Formation of the Absorption Composition Modified (ACM) Microporous Granular Media When a microporous granular media for the applications disclosed has been determined to have a suitable hardness for the applications disclosed herein, in this case a $H_M$ of ≥7, the ACM microporous granular media can be at least partially or completely coated or infused with the absorption composition disclosed herein. Processes for coating the absorption onto or infusing the absorption composition into the microporous granular substrate are described in the present Applicant's U.S. Pat. Nos. 6,180,010; 6,475,393; and 6,491,822. Each of these references is incorporated herein by reference in their entireties.

Example 4

Regeneration of the Backwash Filter Comprising the Disclosed Microporous Granular Media (ACM Microporous Granular Media)

When it becomes advantageous to regenerate the absorption composition modified (ACM) microporous granular media, the general thermal and chemical stability of the substrate material having $H_M$ of ≥7 is advantageous.

Thermal Regeneration. General methods for the thermal pyrolysis of organic substances work for the thermal regeneration of the ACM microporous granular media because of the extremely good thermal stability of the microporous granular substrate. For example, the ACM microporous granular media can be heated from about 550° C. to about 800° C. in an inert atmosphere or in the absence of an inert atmosphere. Even though regeneration of a carbon filter at high temperature requires an inert atmosphere, there is no such requirement for the microporous granular media. This method works well because the hard microporous granular substrates disclosed herein generally can be considered as refractory materials.

Steam Regeneration. Steam regeneration of the ACM microporous granular media also works well because of the extremely good thermal stability of the microporous granular substrate. Steam regeneration works best with lightly polluted media, that is, media that retains less that the maximum capacity of the oily contaminants and/or oily particulates.

Chemical Regeneration. Chemical regeneration of the ACM microporous granular media may also be accomplished by, for example, the addition of alkalinity to steam treatment.

Definitions and Additional Disclosure

To define more clearly the terms used herein, the following definitions are provided, and unless otherwise indicated or the context requires otherwise, these definitions are applicable throughout this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied.

The disclosures of various publications that may be referenced throughout this specification, which are hereby incorporated by reference in pertinent part in order to more fully describe the state of the art to which the disclosed subject matter pertains. To the extent that any definition or usage provided by any document incorporated herein by reference conflicts with the definition or usage provided herein, the definition or usage provided herein controls.

For any particular compound disclosed herein, the general structure presented is also intended to encompasses all conformational isomers and stereoisomers that can arise from a particular set of substituents, unless indicated otherwise or the context provides otherwise. Thus, the general structure encompasses all enantiomers, diastereomers, and other optical isomers whether in enantiomeric or racemic forms, as well as mixtures of stereoisomers, as the context permits or requires. Accordingly, Applicant reserves the right to proviso out any particular individual isomer or isomers, if for any reason Applicant chooses to claim less than the full measure of the disclosure, for example, to account for a reference that Applicant is unaware of at the time of the filing of the application.

Throughout the specification and claims, the word "comprise" and variations of the word, such as "comprising" and "comprises," means "including but not limited to," and is not intended to exclude, for example, other additives, components, elements, or steps. While methods and features are described in terms of "comprising" various steps or components, these methods and features can also "consist essentially of" or "consist of" the various steps or components. Therefore, by the disclosure that a composition, a method, and the like "comprises" one or more elements or steps, Applicant also intends to disclose that the composition, the method, and the like may also "consist essentially of" or "consist of" the recited elements or steps.

As used in the specification and the claims, the singular forms "a," "an," and "the" include plural referents unless the context clearly indicates otherwise. Thus, for example, reference to "a compound" includes mixtures of two or more such compounds, reference to "the composition" includes mixtures of two or more such compositions, and the like.

"Optional" or "optionally" means that the subsequently described event or circumstance can or cannot occur, and that the description includes instances where the event or circumstance occurs and instances where it does not.

For the purposes of describing and defining the present teachings, the term "substantially" is utilized to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Unless indicated otherwise, when a range of any type is disclosed or claimed, for example a range of the percentages, crush strengths, conversions or reaction rates, and the like, it is intended to disclose or claim individually each possible number that such a range could reasonably encompass, including any sub-ranges or combinations of sub-ranges encompassed therein. For example, when describing a range of percentages such as from 85% to 95%, it is understood that this disclosure is intended to encompass each of 85%, 86%, 87%, 88%, 89%, 90%, 91%, 92%, 93%, 94%, and 95%, as well as any ranges, sub-ranges, and combinations of sub-ranges encompassed therein. Applicant's intent is that these two methods of describing the range are interchangeable. Accordingly, Applicant reserves the right to proviso out or exclude any individual members of any such group, including any sub-ranges or combinations of sub-ranges within the group, if for any reason Applicant chooses to claim less than the full measure of the disclosure, for example, to account for a reference that Applicant is unaware of at the time of the filing of the application.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed herein, and that each value is also herein disclosed as "about" that particular value in addition to the value itself. In aspects, "about" can be used to mean within 10% of the recited value, within 5% of the recited value, within 2% of the recited value, or within 1% of the recited value.

Any headings that are employed herein are not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

These and other features, advantages and embodiments of the invention disclosed herein will be readily apparent to those exercising ordinary skill after reading the foregoing disclosures. Accordingly, while specific embodiments of the invention have been described in considerable detail, variations and modifications of those embodiments can be effected without departing from the spirit and scope of the invention as claimed.

What is claimed is:

1. A method of removing oil and particulates from contaminated water, the method comprising the steps of:
   a) flowing water containing contaminants comprising suspended oil droplets and/or particulates through a filter bed comprising a microporous granular media, the microporous granular media comprising a microporous granular substrate having a standard MyCelx Hardness ($H_M$) of greater than or about 7.5 and an average pore size from about 0.2 nm to about 30 nm,
   wherein at least a portion of the microporous granular media is at least partially coated or infused with an absorption composition comprising a homogeneous thermal reaction product of an oil component selected from the group consisting of glycerides, fatty acids, fatty acid esters, alkenes and alkynes, and a methacrylate or acrylate polymer component, and
   wherein the microporous granular media comprises spinel, natural or synthetic zeolite beryl, topaz, or cubic zirconia;
   b) coalescing at least a portion of the oil droplets during flow and retaining the portion of the oil droplets in the filter bed and/or retaining at least a portion of the particulates in the filter bed;

c) terminating the flow of the water after the portion of the oil droplets and/or particulates have been retained in the filter bed; and d) turbulently backwashing the filter bed with a backwash liquid to release the contaminants, and separating the contaminants from the filter bed.

2. A method according to claim 1, further comprising the step of:

e) re-initiating the flow of the water containing the contaminants through the filter bed.

3. A method according to claim 1, wherein the water containing the contaminants further comprises oily particulates, and step b) further comprises coalescing and retaining the oily particulates in the filter bed.

4. A method according to claim 1, wherein the microporous granular media has a MyCelx Hardness ($H_M$) of at least or about 8.0.

5. A method according to claim 1, wherein the microporous granular media has a MyCelx Durability ($D_M$) of Class A.

6. A method according to claim 1, wherein the microporous granular media has a MyCelx Durability ($D_M$) of Class B.

7. A method according to claim 1, wherein the oil component of the homogeneous thermal reaction product comprises fatty acids obtained by the process of:

i) providing an initial glyceride composition comprising one or more drying oils and/or semi-drying oils;

ii) cleaving and separating fatty acids from the initial glyceride composition to provide a fatty acid blend comprising saturated, mono-unsaturated, and/or poly-unsaturated fatty acids, the fatty acid blend being unique to the initial glyceride composition; and iii) thermally reacting the fatty acid blend from step ii) with a methacrylate or acrylate polymer compound to yield the homogeneous thermal reaction product.

8. A method according to claim 1, wherein the microporous granular media has an average particle size from about 0.1 mm to about 6 mm.

9. A method according to claim 1, wherein the microporous granular media has an average pore size from 5 nm to about 18 nm.

10. A method according to claim 1, wherein the microporous granular media has a pore volume from about 0.005 cm³/g to about 0.5 cm³/g.

11. A method according to claim 1, wherein the microporous granular media has a total water content below about 8 wt %.

12. A method according to claim 1, wherein the particulates comprise mineral particulates.

13. A method according to claim 1, further comprising sparging the backwash liquid with an inert gas while turbulently backwashing the filter bed with the backwash liquid.

14. The method according to claim 1, wherein the backwash liquid is water.

15. A method according to claim 1, wherein the microporous granular media has a MyCelx Hardness ($H_M$) of at least 8.5.

16. A method according to claim 1, wherein the microporous granular media has an average pore size from 9 nm to about 18 nm.

17. A method according to claim 1, wherein the microporous granular media comprises spinel, beryl, topaz, or cubic zirconia.

18. A method of removing oily contaminants from contaminated water, comprising the steps of:

a) flowing water containing contaminants comprising freely suspended oil particles and/or solid contaminants in excess of that sufficient to surface wet any solid contaminants which are present through a filter bed of ACM microporous granular media comprising a microporous granular substrate having a standard MyCelx Hardness ($H_M$) of greater than or about 7.5 and an average pore size from about 0.2 nm to about 30 nm within a filter housing, wherein the ACM microporous granular media comprises spinel, natural or synthetic zeolite, beryl, topaz, or cubic zirconia;

b) coalescing the oil particles during flowing the water through the filter bed and independently accumulating the oil particles in interstices of the filter bed during flowing the water therethrough, to achieve a clarified effluent;

c) terminating the flow of the water after the filter bed has become at least partially saturated with the contaminants;

d) cleaning the filter bed by (i) injecting diluent liquid into said filter bed to form a liquid mixture including filter bed granules and the contaminants; (ii) agitating the liquid mixture to dislodge the contaminants from the filter bed granules; and (iii) removing the contaminants from the ACM microporous granular media; and e) reforming the filter bed of ACM microporous granular media for further filtration flow.

19. A method according to claim 18, wherein the ACM microporous granular media has a MyCelx Hardness ($H_M$) of at least or about 8.0.

20. The method as defined in claim 18, wherein the step of cleaning is further characterized by flowing the liquid mixture through a flow path which is in part exterior to the filter housing, and withdrawing part of the diluent liquid and the contaminants from the liquid mixture through a perforated surface in said flow path or wherein the step of cleaning is further characterized by flowing the liquid mixture over a perforated element, and withdrawing at least a portion of the diluent liquid and the contaminants through said perforated element.

21. A method according to claim 18, wherein the ACM microporous granular media has an average pore size from 5 nm to about 18 nm.

22. A method according to claim 18, wherein the ACM microporous granular media has a MyCelx Hardness ($H_M$) of at least 8.5.

23. A method according to claim 18, wherein the ACM microporous granular media has an average pore size from 9 nm to about 18 nm.

24. A method according to claim 18, wherein the ACM microporous granular media comprises spinel, beryl, topaz, or cubic zirconia.

25. A method of removing oil and particulates from contaminated water, the method comprising the steps of:

a) flowing water containing contaminants comprising suspended oil droplets and/or particulates through a filter bed comprising a microporous granular substrate having a standard MyCelx Hardness ($H_M$) of greater than or about 7.5 and an average pore size from about 0.2 nm to about 30 nm, wherein at least a portion of the microporous granular substrate is optionally at least partially coated or infused with an absorption composition comprising a homogeneous thermal reaction product of an oil component selected from the group consisting of glycerides, fatty acids, fatty acid esters, alkenes and alkynes, and a methacrylate or acrylate polymer component, and wherein the microporous granular substrate comprises spinel, natural or synthetic zeolite, beryl, topaz, or cubic zirconia;

b) coalescing at least a portion of the oil droplets during flow and retaining the portion of the oil droplets in the filter bed and/or retaining at least a portion of the particulates in the filter bed;

c) terminating the flow of the water after the portion of the oil droplets and/or particulates have been retained in the filter bed; and d) turbulently backwashing the filter bed with retained oil and particulate contaminants with a backwash liquid to release the contaminants, and separating the contaminants that are released from the filter bed.

26. A method according to claim 25, wherein the microporous granular substrate has a MyCelx Hardness ($H_M$) of at least or about 8.0.

27. A method according to claim 25, further comprising the step of:

e) re-initiating the flow of the water containing the contaminants comprising the oil droplets and/or particulates through the filter bed.

28. A method according to claim 25, wherein the microporous granular substrate has an average pore size from 5 nm to about 18 nm.

29. A method according to claim 25, wherein the microporous granular substrate has a MyCelx Hardness ($H_M$) of at least 8.5.

30. A method according to claim 25, wherein the microporous granular substrate has an average pore size from 9 nm to about 18 nm.

31. A method according to claim 25, wherein the microporous granular substrate comprises spinel, beryl, topaz, or cubic zirconia.

* * * * *